United States Patent [19]

Aleck

[11] Patent Number: 5,178,544

[45] Date of Patent: * Jan. 12, 1993

[54] GRAPHIC METHOD FOR REPORTING RISK TO A PATIENT

[75] Inventor: Kyrieckos A. Aleck, Santa Fe, N. Mex.

[73] Assignee: Vivigen, Inc., Santa Fe, N. Mex.

[ * ] Notice: The portion of the term of this patent subsequent to Aug. 6, 2008 has been disclaimed.

[21] Appl. No.: 734,934

[22] Filed: Jul. 24, 1991

Related U.S. Application Data

[63] Continuation of Ser. No. 272,084, Nov. 16, 1988, Pat. No. 5,037,305.

[51] Int. Cl.$^5$ .................. G09B 29/00; B42D 15/00
[52] U.S. Cl. ........................... 434/262; 33/1 C; 33/1 SD; 283/115; 434/107; 434/430
[58] Field of Search ............ 434/262, 107, 188, 191, 434/408, 430, 433; 33/1 C, 1 SD; 283/115

[56] References Cited

U.S. PATENT DOCUMENTS

| 396,381 | 1/1889 | Yaggy | 434/269 |
| 2,924,895 | 8/1960 | Bachi | 434/460 |
| 3,332,317 | 7/1967 | Peckman et al. | 434/408 |
| 3,577,854 | 5/1971 | Felix | 33/1 C |
| 4,464,122 | 9/1984 | Fuller et al. | 434/262 |
| 5,037,305 | 8/1991 | Aleck | 434/262 |

OTHER PUBLICATIONS

*Probability and Statistics*, Mosteller et al. pp. 5, 6, 7, 322, 323 ©1961 Addison–Wesley Publishing Co. Inc.
*Statistical Methods in Research*, Johnson. 1949. pp. 22–29 Prentice Hall, Inc.
Visucom Catalog ©1964 p. 13.

*Primary Examiner*—William H. Grieb
*Attorney, Agent, or Firm*—Christie, Parker & Hale

[57] ABSTRACT

A graph comprising a distribution curve for displaying a distribution of test results for given population and a density gradient superimposed over the distribution curve for displaying and probability of an event or condition occurring for each such test result in the distribution. Typically the distribution curve is plotted against a cartesian coordinate system. The density gradient is superimposed below the distribution curve and shows the increasing risk of a condition as a function of a test result by an increase in density of the gradient with increasing risk. A marker imposed on the distribution curve shows the test result for a specific individual.

6 Claims, 5 Drawing Sheets

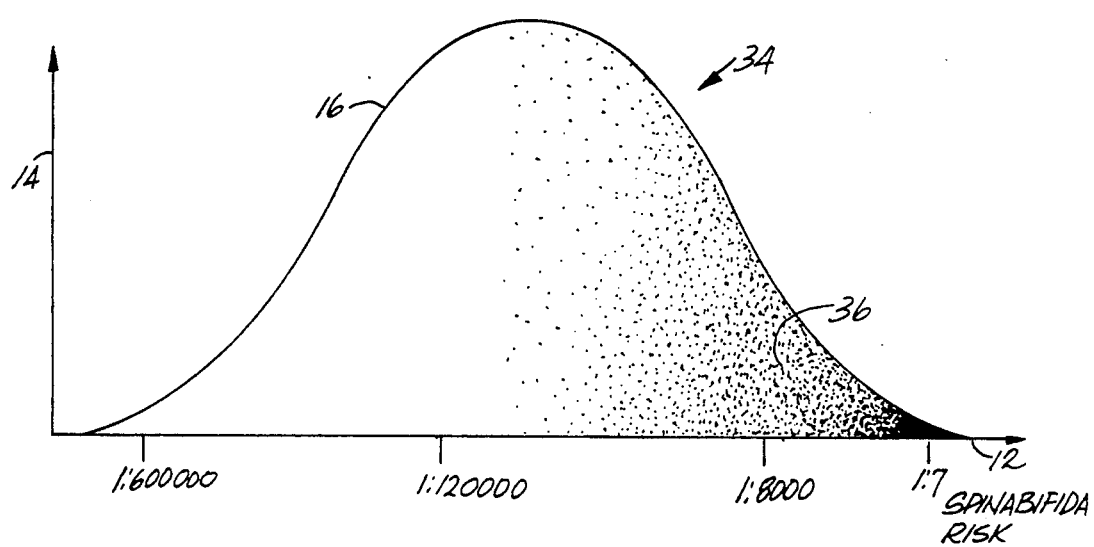

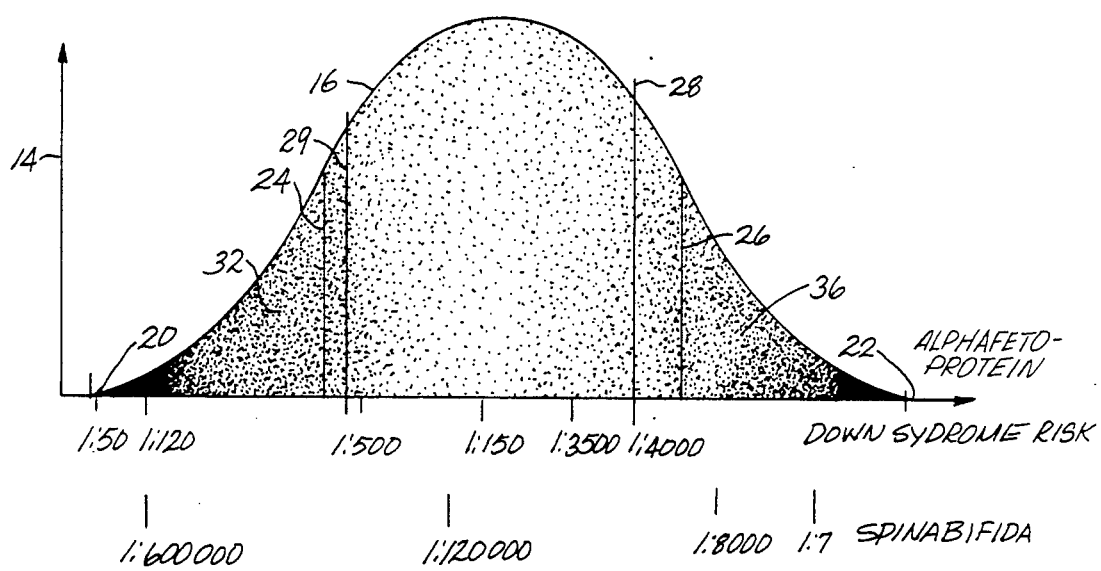

GRAPHIC METHOD FOR REPORTING RISK TO A PATIENT

This is a continuation of application Ser. No. 07/272,084, filed Nov. 16, 1988, now U.S. Pat. No. 5,037,305, granted Aug. 6, 1991.

FIELD OF THE INVENTION

This invention relates to the field of charts and graphs for reporting test results to a patient and more specifically a graph for simultaneously reporting to a patient the results of a test, the normalcy of that test result and the risk of an event occurring based on that test result.

BACKGROUND OF THE INVENTION

The world, and particularly the medical world, is primarily one of probabilities. For example, a patient contemplating a heart transplant cannot be told whether or not he will survive, but only the statistical probability that he will survive. Similarly, a patient considering taking a medication, cannot be told that the medication is effective, but only that it is, for example, 80% effective or 20% effective. This uncertainty is particularly disconcerting in diagnostic testing.

For example, expectant mothers are often tested for the level of alphafetoprotein in their blood. If the level of the protein is high, it is likely that the fetus has a neural tube defect. If the level of the protein is low, it is likely that the fetus has Down Syndrome. The test, however, is not certain. Again, the level of the protein is used only to indicate the statistical probability or risk that the fetus has one of the above mentioned conditions.

Currently, statistical probabilities regarding risk are not always conveyed to the patient clearly. Many health care professionals use threshold probabilities upon which they base their advice. If a risk exceeds a chosen threshold, they make a recommendation, e.g., a remedy to reduce or eliminate the risk or a test to more accurately determine the risk. If the risk is below the threshold then the recommendation, e.g., remedy or test, is not made. The use of a threshold value alone, however, provides no indication of how the risk increases or decreases above or below that threshold. Thus, the use of a threshold-based recommendation provides little information for the patient to independently determine whether to undergo a recommended remedy or test.

As an illustration, if the level of alphafetoprotein in the blood of an expectant mother is below a threshold level, a physician may recommend that an amniocentesis be performed to determine whether, in fact, the fetus has Down Syndrome. If the level is above the threshold level, an amniocentesis is not recommended. What is not told to the patient is whether the risk changes substantially above or below that threshold level. Depending on that change, and on the patient's aversion to amniocentesis or concern over Down Syndrome, an expectant mother whose level of alphafetoprotein is above the threshold level may still decide to accept the risks associated with amniocentesis and undergo that procedure. Likewise, an expectant mother whose alphafetoprotein level is below the threshold may nevertheless decide not to undergo the recommended amniocentesis procedure.

Accordingly, there is a need for a means to clearly indicate to the patient the results of a particular test and the risk associated with that test result together with information indicating whether the result is a normal one and how the risk changes as the result changes. The patient can then make an informed decision on how to proceed. He can use the knowledge of the risk together with his own concern regarding the remedy or further testing to make the decision which is best for him.

The invention is a method of displaying the results of testing maternal blood serum of a patient for alphafetoprotein level. Specifically, a distribution curve of alphafetoprotein levels in maternal blood serum for a population of patients is represented on a surface in cartesian coordinates, such that the distribution curve represents the number of expectant mothers on the vertical axis and the alphafetoprotein level on the horizontal axis. A gradually changing risk, increasing for Down Syndrome and decreasing for Open Spina Bifida, with decreasing alphafetoprotein levels is represented on the surface along the horizontal axis. A mark representing the alphafetoprotein level of the patient being tested is placed on the surface. The risk of Down Syndrome and/or Open Spina Bifida to the patient is displayed at the mark by the representation of risk along the horizontal axis. As a result, the patient is more easily able to assess the risk of abnormality than by prior AFP reporting techniques.

BRIEF DESCRIPTION OF THE DRAWINGS

FIG. 4 shows an overlay displaying the risk of a condition, spina bifida in the fetus, associated with the indicator used in FIG. 1 as a density gradient.

FIG. 5 shows the overlays of FIGS. 2 and 4 superimposed on the graph of FIG. 1 according to the present invention.

DETAILED DESCRIPTION

The graphs of the present invention are particularly applicable for reporting to expectant mothers the risk of their child being born with either Down Syndrome or spina bifida. The risk of both conditions is determined statistically on the basis of the amount of alphafetoprotein measured in the expectant mother's blood.

Figure 1:
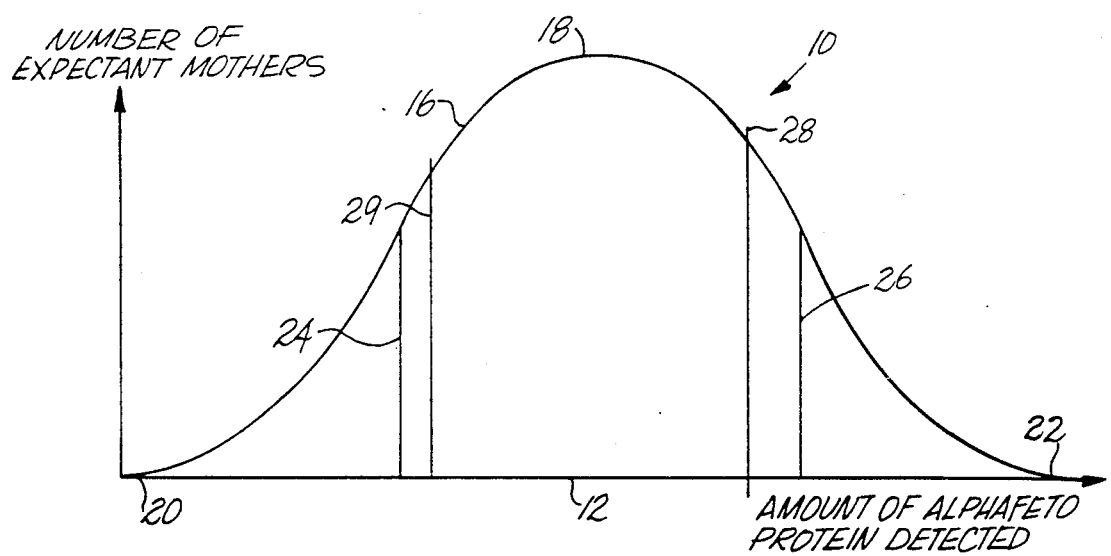
FIG. 1 shows a graph displaying the distribution of an indicator, alphafetoprotein concentration, within a population, expectant mothers.

FIG. 1 shows a graph 10 or chart according to the present invention showing the results of blood tests for alphafetoprotein of expectant mothers. The graph is based on a cartesian coordinate system with a horizontal and a vertical axis 12, 14. The amount of alphafetoprotein detected in blood tests of expectant women is depicted on the horizontal axis 12. The number of expectant mothers having a specific amount of alphafetoprotein detected in a blood test is indicated on the vertical axis 14.

The distribution curve 16 plotted against the two axes 12, 14 is, in this case, in the shape of a bell curve. The curve indicates the distribution of different alphafetoprotein concentrations found in blood samples. The largest number of expectant mothers had a level of alphafetoproteins corresponding to the peak 18 of the bell curve. No expectant mothers had a tested concentration of alphafetoproteins lower than the left end 20 of the curve nor higher than the right end 22 of the curve. For purposes of illustration, the levels of alphafetoprotein which are considered normal by most physicians are the levels between the normal minimum line 24 and the normal maximum line 26.

The normalcy lines 24, 26 represent the levels beyond which a physician is likely to recommend further testing. The information used to draw the distribution curve is obtained by compiling test results from a population of tested expectant mothers. The tested population may consist of all tested expectant mothers or a selected sample group. The sample group may be chosen either to reflect the test results anticipated for a large population or for a specialized population with, for example, a specific range of ages or geographical affiliations.

The graph 10 is used to report an individual expectant mother's test results. Such test results can be displayed by a vertical marker 28, which extends through the point on the horizontal axis 12 corresponding to the alphafetoprotein concentration detected in the expectant mother's blood. A second vertical marker 29 displays a different test result for a second individual. Any number of individual test results may be indicated. However, it is preferred that the test results of only one person be shown so that the test results remain confidential.

Looking at the graph 10, the individual can immediately see how close her test result is to the prevailing norm and how close her test result is to the accepted normal limits 24, 26. The graph 10 may be supplemented with information on averages, medians and standard deviations. The average and median values could be displayed, for example, using additional vertical markers. The accuracy of the individual's test results, commonly expressed as plus or minus a certain fraction of the value obtained, could be expressed using the width of the vertical marker 28.

Figure 2:
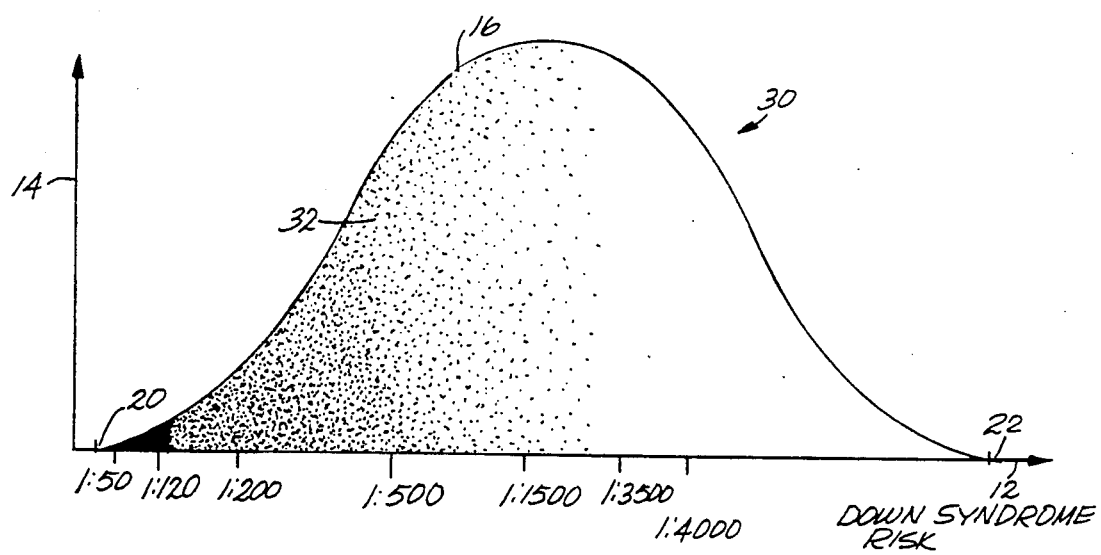
FIG. 2 shows an overlay displaying the risk of a condition, Down Syndrome in the fetus, associated with the indicator used in FIG. 1 as a density gradient.

FIG. 2 shows an overlay 30 which may be placed over the graph 10 of FIG. 1. For ease of interpretation, the overlay 30 preferably uses the same distribution curve 16 plotted against the same horizontal and vertical axes 12, 14. Preferably, the graph 10 is drawn on an opaque sheet and the overlay 30 is drawn on a transparent sheet so that the details of the graph 10 can be seen through the transparent sheet 30 when the overlay 30 is placed over the graph 10.

The alphafetoprotein concentration level in the blood of an expectant mother is used as an indicator for the risk of the child being born with Down Syndrome. The lower the alphafetoprotein level, the greater the chance that the child will have Down Syndrome. This information can be valuable to a mother considering whether to undergo an amniocentesis procedure.

The overlay 30 of FIG. 2 is designed to indicate the risk of the child being born with Down Syndrome. That risk is shown by a gradual density gradient along the horizontal axis and below the distribution curve. As the level of alphafetoprotein decreases, the risk of bearing a child with Down Syndrome increases, which is shown by an increase in the density of the gradient. It is understood that the density gradient is not related to the vertical axis 14 and could, therefore, extend above the distribution curve, if desired. The ratios below the horizontal axis 12 indicate the risk numerically.

Figure 3:
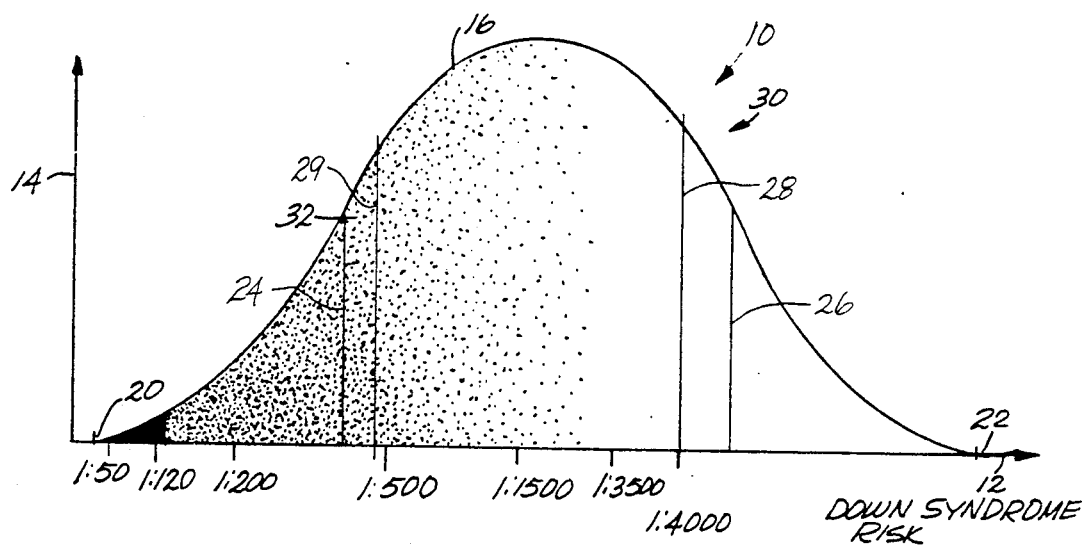
FIG. 3 shows the overlay of FIG. 2 superimposed on the graph of FIG. 1 according to the present invention.

The overlay 30, as depicted in FIG. 2, is placed over the graph 10 of FIG. 1 to provide the tested individual with the additional risk-related information of FIG. 2, as shown in FIG. 3. By looking at the graph 10 together with the overlay 30 as shown in FIG. 3, the individual can easily compare her test results to the general distribution shown by the curve 16 and at the same time to the level of risk that her child will be born with Down Syndrome. An individual with test results similar to those shown by the marker 28 substantially above the threshold marker 24, in FIG. 3 could quickly conclude that her results were well within normal limits and the risk of Down Syndrome was less than it is for most. An individual with test results indicated by marker 29, still above the threshold level, but only slightly so, may conclude that there is not an appreciable difference in risk between her indicated level and a level just below the threshold level. If so, she may conclude that further testing, e.g. amniocentesis, is warranted.

The presentation of FIG. 3 may be produced either by laying a transparent sheet containing the density gradient 32 over an opaque sheet containing the graph 10 or by combining the graph 10 and overlay 30 to form a single graph on a single sheet. Alternatively, the presentation of FIG. 3 may be obtained by laying a transparent sheet containing the graph 10 over an opaque sheet containing the density gradient 32.

Alphafetoprotein levels in expectant mothers are also used as an indicator to estimate the risk that a child will be born with a neural tube defect, i.e. spina bifida. FIG. 4 shows on overlay 34 similar to that of FIG. 2 which shows the spina bifida risk using a density gradient 36. The risk decreases along the horizontal axis towards the origin and the density lessens accordingly. As with FIG. 2, the vertical axis is not related to the density gradient. Again, the ratios below the horizontal axis 12 indicate the risk numerically. The overlay 34 of FIG. 3 can be placed over the graph 10 of FIG. 1 either alone or together with the overlay 30 of FIG. 2.

In FIG. 5 the two overlays 30, 34 have been combined with the graph 10 of FIG. 1. This can be done either by laying both overlays 30, 34 over the graph 10 or by producing a new graph depicting the information in both overlays 30, 34 and the old graph 10. By looking at a graph similar to FIG. 5 the individual can compare her test results with those of the population, and assess the risk of both Down Syndrome and spina bifida all at the same time. This allows her to make a more educated judgment more quickly as to how to proceed than was possible previously.

In a preferred embodiment, the overlays are printed on transparent sheets and the density gradients of the overlays are different colors. For example, the density gradient for Down Syndrome could be red and the density gradient for spina bifida could be blue. The underlying graph corresponding to graph 10 of FIG. 1 is preferably printed on an opaque sheet so that the markers and normalcy lines show clearly through the transparent sheets. White is preferred for the background so that the density gradients are more clearly seen. Accordingly, both risks may be evaluated independently but form the same presentation.

The combination of graphs and overlays can be used to convey a great variety of data. Presently, it is preferred for use with medical test results and may be adapted for a wide variety of tests. For example, cholesterol level is often measured to assess the risk of heart attack. The bell shaped curve 16 of FIG. 1, could easily be adapted to show the distribution of cholesterol levels in a population. The population could be a large one, e.g. all adults, or a narrower one, e.g. smokers in North Dakota between 30 and 40 years of age. The marker again would show the measured cholesterol level for a particular individual and the overlays would show the risk of heart attack as a density gradient.

Other types of data may also be presented. For example, the chart could plot admission test scores along the horizontal axis against the number obtaining that score on the vertical axis for all test takers or for takers on a particular date or in a particular geographic area. The overlays could then be used to show the likelihood of gaining admittance. If the admittance test was a nationwide exam like the SAT (Scholastic Aptitude Test) or GRE (Graduate Record Exam), different overlays could be prepared for different schools. The individual, by placing different overlays over the chart, could easily judge his chances for admittance at different schools.

The graphs of the present invention are useful for the presentation of all types of data, provided that there is a distribution of values for a given population and a statistical probability of an event occurring for each such value. The exemplary embodiments herein all use a cartesian coordinate system which is presently preferred for the information depicted. However, it is apparent that, for example, a polar coordinate system may be used in some cases. It is also apparent that, for example, a bar graph may be used to depict the distribution curve.

The invention is particularly well suited for computer printing. In a medical lab test environment a computer could store a variety of distribution curves and shading overlays for different risk groups. When a test result is obtained, the computer could then select the appropriate distribution curve, apply the appropriate overlay and draw the markers indicating the test result. Personalized reports could be provided quickly and easily. The results may also be displayed on a computer monitor directly.

It will be understood that a great variety of modifications and adaptations may be made to the present invention without departing from its spirit and scope. By only showing a few exemplary embodiments the inventor does not intend to abandon these variations.

What is claimed is:

1. A method of displaying the results of testing maternal blood serum of a patient for alphafetoprotein level, the method comprising the steps of:

representing on a surface in Cartesian coordinates a distribution curve of alphafetoprotein levels in maternal blood serum for a population of patients such that the distribution curve represents the number of expectant mothers on the vertical axis and the alphafetoprotein level on the horizontal axis;

representing on the surface a gradually increasing risk of Down Syndrome with decreasing alphafetoprotein levels along the horizontal axis; and placing on the surface a mark representing the alphafetoprotein level of the patient being tested, and thus the risk of Down Syndrome to the patient by the representation of risk along the horizontal axis at the mark.

2. The method of claim 1 in which the distribution curve represents increasing alphafetoprotein level from left-to-right on the surface and the risk represented along the horizontal axis decreases from left-to-right in a manner that represents the risk of Down Syndrome.

3. The method of claim 2, additionally comprising the step of representing on the surface a gradually increasing risk of Open Spina Bifida with increasing levels of alphafetoprotein on the horizontal axis.

4. The method of claim 1, additionally comprising the step of representing on the surface a gradually increasing risk of Open Spina Bifida with increasing levels of alphafetoprotein on the horizontal axis.

5. A method of displaying the results of testing material blood serum of a patient for alphafetoprotein level, the method comprising the steps of:

representing on a surface in cartesian coordinates a distribution curve of alphafetoprotein levels in maternal blood serum for a population of patients such that the distribution curve represents the number of expectant mothers on the vertical axis and the alphafetoprotein level on the horizontal axis;

representing on the surface a gradually increasing risk of Open Spina Bifida with increasing alphafetoprotein levels along the horizontal axis; and placing on the surface a mark representing the alphafetoprotein level of the patient being tested, and thus the risk of Open Spina Bifida to the patient by the representation of risk along the horizontal axis at the mark.

6. The method of claim 5 in which the distribution curve represents increasing alphafetoprotein level from left-to-right on the surface and the risk represented along the horizontal axis increases from left-to-right in a manner that represents the risk of Open Spina Bifida.

* * * * *